United States Patent
Boshra (10) Patent No.: US 9,230,152 B2
(45) Date of Patent: Jan. 5, 2016

(54) ELECTRONIC DEVICE FOR PROCESSING COMPOSITE FINGER MATCHING BIOMETRIC DATA AND RELATED METHODS

(71) Applicant: APPLE INC., Cupertino, CA (US)

(72) Inventor: Michael Boshra, Melbourne, FL (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/465,196

(22) Filed: Aug. 21, 2014

(65) Prior Publication Data

US 2015/0347816 A1     Dec. 3, 2015

Related U.S. Application Data

(60) Provisional application No. 62/007,151, filed on Jun. 3, 2014.

(51) Int. Cl.
    *G06K 9/00*      (2006.01)

(52) U.S. Cl.
    CPC .......... *G06K 9/00087* (2013.01); *G06K 9/0002* (2013.01); *G06K 9/00026* (2013.01); *G06K 9/00926* (2013.01)

(58) Field of Classification Search
CPC combination set(s) only.
See application file for complete search history.

(56) References Cited

U.S. PATENT DOCUMENTS

| | | | |
|---|---|---|---|
| 5,953,441 A | 9/1999 | Setlak | |
| 5,982,914 A | 11/1999 | Lee et al. | |
| 6,160,903 A * | 12/2000 | Hamid | G07C 9/00158 382/115 |
| 6,289,114 B1 | 9/2001 | Mainguet | |
| 6,317,508 B1 | 11/2001 | Kramer et al. | |
| 6,333,989 B1 | 12/2001 | Borza | |
| 6,459,804 B2 | 10/2002 | Mainguet | |
| 6,546,122 B1 | 4/2003 | Russo | |
| 6,795,569 B1 | 9/2004 | Setlak | |
| 7,184,579 B2 * | 2/2007 | Mizoguchi | G06K 9/00087 340/5.83 |
| 7,197,168 B2 * | 3/2007 | Russo | G06K 9/00026 382/125 |
| 7,361,919 B2 * | 4/2008 | Setlak | G06K 9/00013 250/208.1 |
| 7,469,024 B2 * | 12/2008 | Khayrallah | H04B 1/7113 375/267 |
| 7,474,773 B2 * | 1/2009 | Chau | G06K 9/00046 382/116 |
| 7,587,072 B2 * | 9/2009 | Russo | G06F 3/03547 382/124 |

(Continued)

FOREIGN PATENT DOCUMENTS

| | | |
|---|---|---|
| EP | 0778541 B1 | 5/2000 |
| WO | 98/46114 A2 | 10/1998 |
| WO | 99/06942 A1 | 2/1999 |

*Primary Examiner* — Anand Bhatnagar
(74) *Attorney, Agent, or Firm* — Allen, Dyer, Doppelt, Milbrath & Gilchrist, P.A. Attorneys at Law (57) ABSTRACT

A device may include a finger biometric sensor and a processor coupled thereto. The processor may acquire first and second finger matching biometric data based upon first and second finger placements adjacent the sensor. The processor may also perform a matching between the first and second finger matching data to generate composite finger matching data having an associated composite match score, perform another matching between the composite matching data and finger enrollment data when the composite match score exceeds a match threshold to generate an enrollment match score, and update the finger enrollment data with the composite matching data when the enrollment match score exceeds an enrollment threshold. In other embodiments, where the second finger matching data is acquired based upon a removal and replacement of the finger from adjacent the finger sensor, instead of or in addition to updating the finger enrollment data, a device function may be performed.

23 Claims, 8 Drawing Sheets

(56) References Cited

U.S. PATENT DOCUMENTS

| | | | | |
|---|---|---|---|---|
| 8,165,355 B2 * | 4/2012 | Benkley | | G06F 3/041 |
| | | | | 345/156 |
| 8,693,736 B2 * | 4/2014 | Benkley | | G06K 9/00026 |
| | | | | 382/107 |
| 8,797,140 B2 * | 8/2014 | Shinzaki | | G06F 21/32 |
| | | | | 340/5.52 |
| 8,983,143 B2 * | 3/2015 | Abiko | | G06K 9/00006 |
| | | | | 382/115 |
| 9,076,027 B2 * | 7/2015 | Miura | | G06K 9/00087 |
| 2005/0047485 A1 * | 3/2005 | Khayrallah | | H04B 1/7117 |
| | | | | 375/148 |
| 2007/0230754 A1 * | 10/2007 | Jain | | G06K 9/00093 |
| | | | | 382/125 |
| 2008/0240523 A1 * | 10/2008 | Benkley | | G06K 9/00026 |
| | | | | 382/126 |

* cited by examiner

ELECTRONIC DEVICE FOR PROCESSING COMPOSITE FINGER MATCHING BIOMETRIC DATA AND RELATED METHODS

FIELD OF THE INVENTION

The present invention relates to the field of electronics, and, more particularly, to the field of finger sensors.

BACKGROUND

Fingerprint sensing and matching is a reliable and widely used technique for personal identification or verification. In particular, a common approach to fingerprint identification involves scanning a sample fingerprint or an image thereof and storing the image and/or unique characteristics of the fingerprint image. The characteristics of a sample fingerprint may be compared to information for reference fingerprints already in a database to determine proper identification of a person, such as for verification purposes.

A fingerprint sensor may be particularly advantageous for verification and/or authentication in an electronic device, and more particularly, a portable device, for example. Such a fingerprint sensor may be carried by the housing of a portable electronic device, for example, and may be sized to sense a fingerprint from a single-finger.

Where a fingerprint sensor is integrated into an electronic device or host device, for example, as noted above, it may be desirable to more quickly perform authentication, particularly while performing another task or an application on the electronic device and based upon different finger conditions. In other words, it may be particularly undesirable to have a user wait while a fingerprint is processed for authentication. Performing a fingerprint authentication with a reduced user delay and while maintaining a desired level of security may be increasingly difficult when a fingerprint sensor is integrated in a host device, such as a personal computer or cellphone.

SUMMARY

An electronic device may include a finger biometric sensor and a processor coupled to the finger biometric sensor. The processor may be capable of acquiring first finger matching biometric data from the finger biometric sensor based upon a first finger placement adjacent the finger biometric sensor and acquiring second finger matching biometric data from the finger biometric sensor based upon a second finger placement adjacent the finger biometric sensor. The processor may also be capable of performing a matching between the first and second finger matching biometric data to generate composite finger matching biometric data having an associated composite match score and performing another matching between the composite finger matching biometric data and finger enrollment biometric data when the composite match score exceeds a composite match score threshold to generate an enrollment match score. The processor may further be capable of updating the finger enrollment biometric data with the composite finger matching biometric data when the enrollment match score exceeds an enrollment match score threshold. Accordingly, the electronic device may perform a finger matching operation more quickly as finger conditions change, for example, by updating the finger enrollment biometric data with finger biometric data representative of the changing finger conditions.

The processor may be capable of performing a first finger matching between the first finger matching biometric data and finger enrollment biometric data. The processor may be capable of performing a second finger matching between the second finger matching biometric data and the finger enrollment biometric data, for example.

The electronic device may further include a memory coupled to the processor and capable of storing the finger enrollment biometric data. The memory may be capable of storing the first finger matching biometric data, for example.

The electronic device may further include a housing and a user input device carried by the housing. The user input device may be carried by the finger biometric sensor. The user input device may include a finger-operated input device, for example. The processor may be capable of performing the matching and the another matching also based upon operation of the finger-operated user input device.

The electronic device may also include a wireless transceiver coupled to the processor. The finger biometric sensor may be a slide finger biometric sensor. The finger biometric sensor may also be a static placement finger biometric sensor. Of course, in some embodiments, the finger biometric sensor may be capable of operation as both a slide and a static placement finger biometric sensor.

An electronic device aspect is directed to an electronic device that includes a portable housing, a wireless transceiver carried by the portable housing, and the finger biometric sensor carried by the portable housing.

Another device aspect is directed to an electronic device that may include a finger biometric sensor and a processor coupled to the finger biometric sensor. The processor may be capable of acquiring first finger matching biometric data from the finger biometric sensor based upon a first finger placement of a finger adjacent the finger biometric sensor and acquiring second finger matching biometric data from the finger biometric sensor based upon removal of the finger from adjacent the finger biometric sensor and replacement of the finger at a second finger placement adjacent the finger biometric sensor. The processor may also be capable of performing a matching between the first and second finger matching biometric data to generate composite finger matching biometric data having an associated composite match score and performing another matching between the composite finger matching biometric data and finger enrollment biometric data when the composite match score exceeds a composite match score threshold to generate an enrollment match score. The processor may further be capable of performing a device function when the enrollment match score exceeds an enrollment match score threshold A method aspect is directed to a method of updating finger enrollment biometric data in electronic device comprising a finger biometric sensor and a processor coupled to the finger biometric sensor. The method may include using the processor to acquire first finger matching biometric data from the finger biometric sensor based upon a first finger placement adjacent the finger biometric sensor and acquire second finger matching biometric data from the finger biometric sensor based upon a second finger placement adjacent the finger biometric sensor. The method may also include using the processor to perform a matching between the first and second finger matching biometric data to generate composite finger matching biometric data having an associated composite match score and perform another matching between the composite finger matching biometric data and the finger enrollment biometric data when the composite match score exceeds a composite match score threshold to generate an enrollment match score. The method may further include using the processor to update the finger enrollment biometric data with the composite finger matching biometric data when the enrollment match score exceeds an enrollment match score threshold.

Another method aspect is directed to a method of performing a device function in an electronic device comprising a finger biometric sensor and a processor coupled to the finger biometric sensor. The method may include using the processor for acquiring first finger matching biometric data from the finger biometric sensor based upon a first finger placement of a finger adjacent the finger biometric sensor and acquiring second finger matching biometric data from the finger biometric sensor based upon removal of the finger from adjacent the finger biometric sensor and replacement of the finger at a second finger placement adjacent the finger biometric sensor. The method may also include using the processor for performing a matching between the first and second finger matching biometric data to generate composite finger matching biometric data having an associated composite match score, performing another matching between the composite finger matching biometric data and finger enrollment biometric data when the composite match score exceeds a composite match score threshold to generate an enrollment match score, and performing the device function when the enrollment match score exceeds an enrollment match score threshold.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
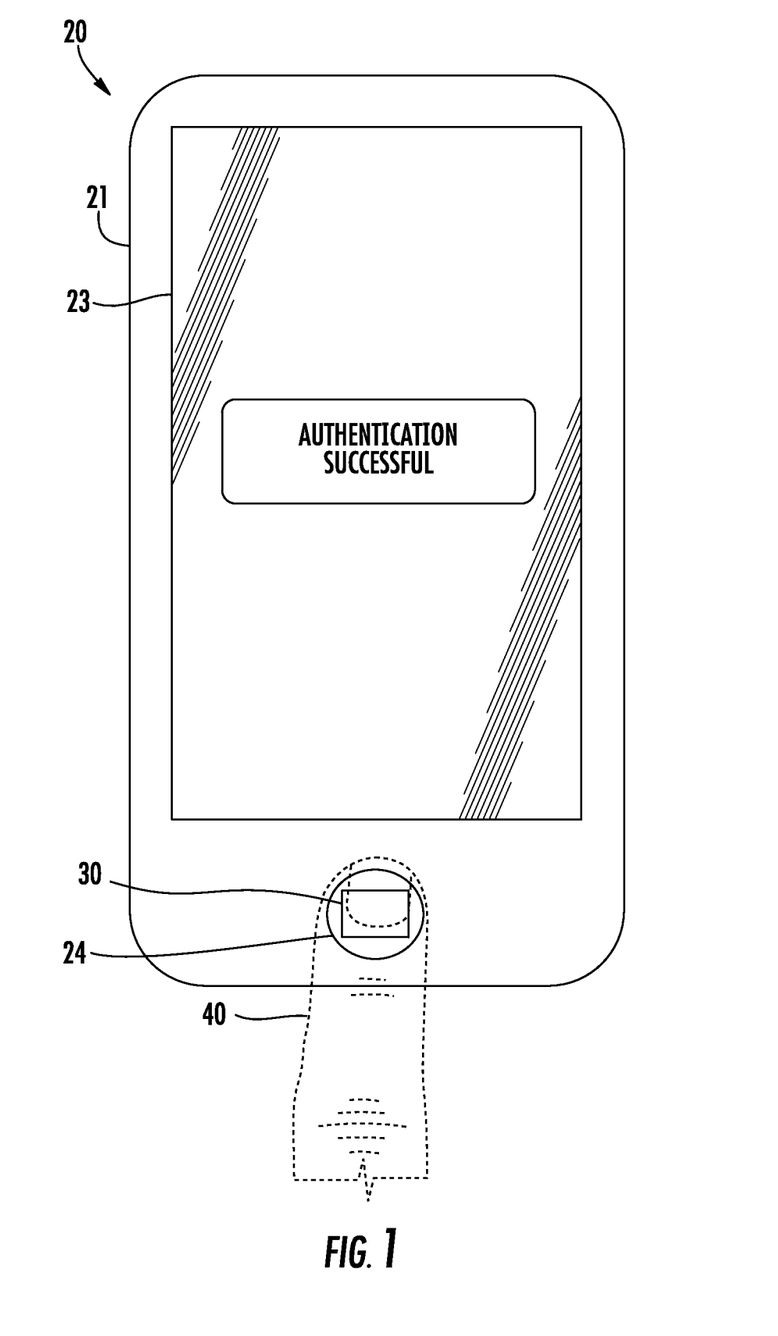
FIG. 1 is a plan view of an electronic device according to an embodiment.
Figure 2:
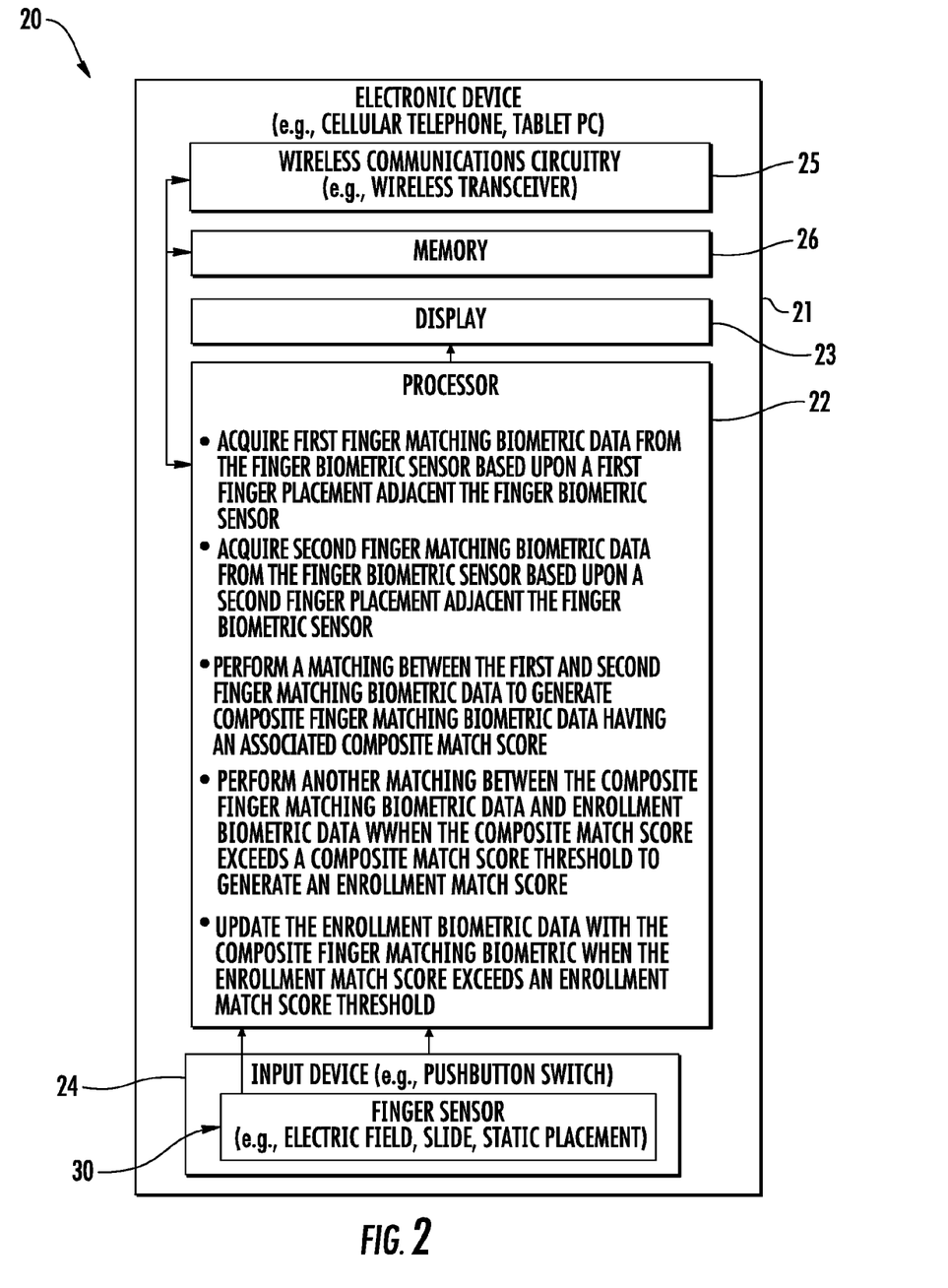
FIG. 2 is a schematic block diagram of an electronic device according to an embodiment.

Referring initially to FIGS. 1 and 2, an electronic device 20 is now described. The electronic device 20 illustratively includes a portable housing 21 and a processor 22 carried by the portable housing. The electronic device 20 is illustratively a mobile wireless communications device, for example, a cellular telephone. The electronic device 20 may be another type of electronic device, for example, a tablet computer, laptop computer, etc.

A wireless transceiver 25 is also carried within the housing 21 and coupled to the processor 22. The wireless transceiver 25 cooperates with the processor 22 to perform at least one wireless communications function, for example, for voice and/or data. In some embodiments, the electronic device 20 may not include a wireless transceiver 25 or other wireless communications circuitry.

A display 23 is also carried by the portable housing 21 and is coupled to the processor 22. The display 23 may be a liquid crystal display (LCD), for example, or may be another type of display, as will be appreciated by those skilled in the art. A memory 26 is also coupled to the processor 22. The memory 26 is for storing finger matching biometric data and a subset of the finger matching biometric data, as will be described in further detail below.

A finger-operated user input device 24, illustratively in the form of a pushbutton switch, is also carried by the portable housing 21 and is coupled to the processor 22. The pushbutton switch 24 cooperates with the processor 22 to perform a device function in response to the pushbutton switch. For example, a device function may include a powering on or off of the electronic device 20, initiating communication via the wireless communications circuitry 25, and/or performing a menu function.

More particularly, with respect to a menu function, the processor 22 may change the display 23 to show a menu of available applications based upon pressing of the pushbutton switch 24. In other words, the pushbutton switch 24 may be a home switch or button, or key. Of course, other device functions may be performed based upon the pushbutton switch 24, for example, switching to a user-interface unlocked mode. In some embodiments, the finger-operated user input device 24 may be a different type of finger-operated user input device, for example, forming part of a touch screen display. Other or additional finger-operated user input devices may be carried by the portable housing 21.

A finger biometric sensor 30 is carried by the pushbutton switch 24 to sense a user's finger 40 or an object placed adjacent the finger biometric sensor. The finger biometric sensor 30 is carried by the pushbutton switch 24 so that when a user contacts and/or presses downward on the pushbutton switch, data from the user's finger 40 is acquired, for example, for finger matching and/or spoof detection, as will be appreciated by those skilled in the art. In other words, the finger biometric sensor 30 may be responsive to static contact or placement of the user's finger 40 or object. Of course, in other embodiments, for example, where the finger biometric sensor 30 is not carried by a pushbutton switch, the finger biometric sensor may be a slide sensor and may be responsive to sliding contact, or the finger biometric sensor may be a standalone static placement sensor.

Figure 3:
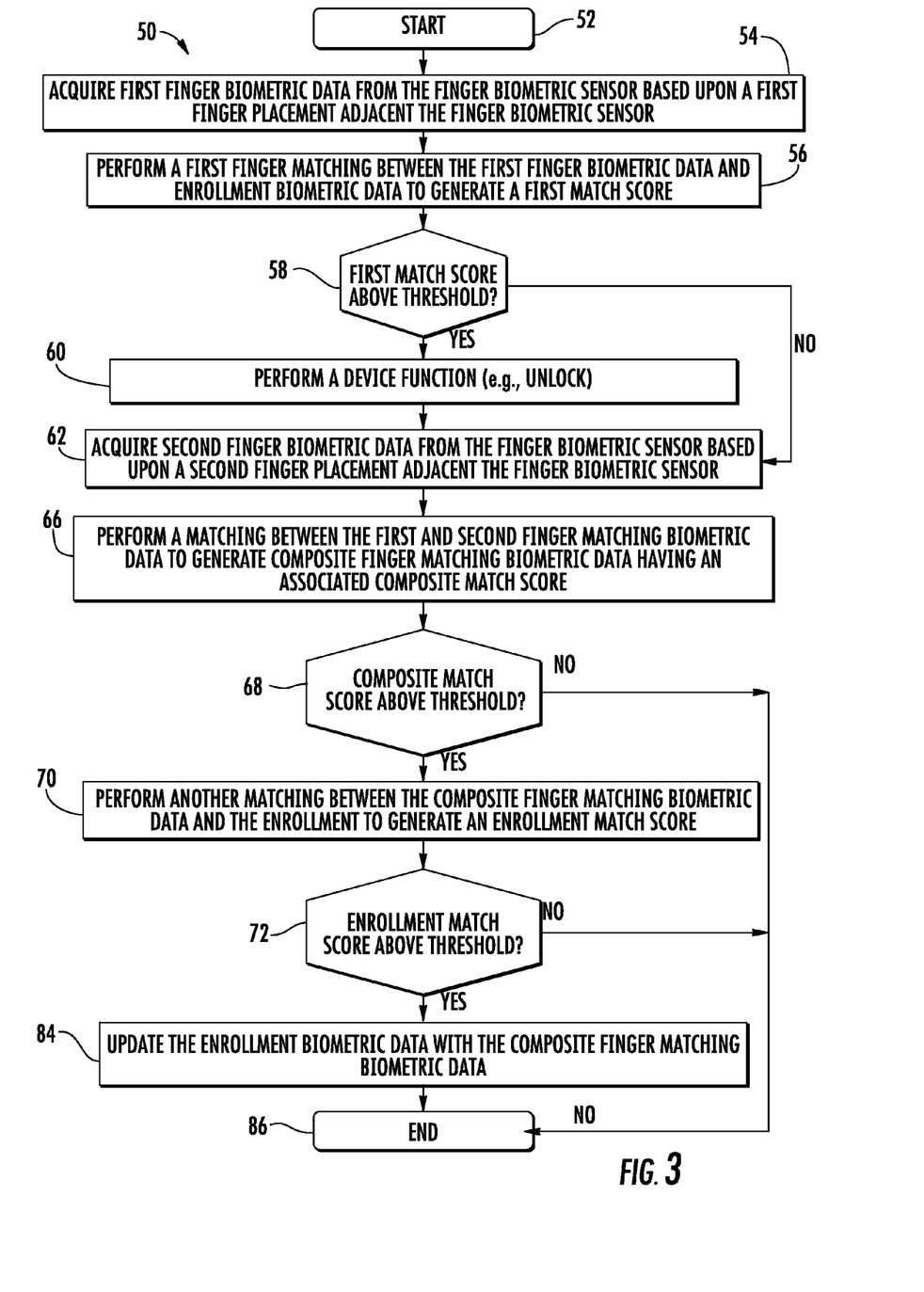
FIG. 3 is a flow diagram illustrating operation of the electronic device of FIG. 2.
Figure 4A:
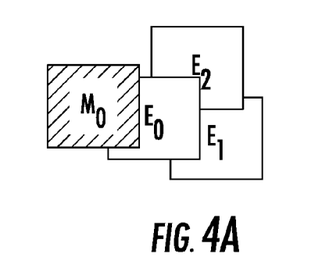
FIG. 4a is a diagram illustrating matching of first finger matching biometric data to finger enrollment biometric data.

Referring now additionally to the flowchart 50 in FIG. 3, and FIGS. 4a-4d, operation of the electronic device 20 is now described. Beginning at Block 52 the processor 22, at Block 54, acquires first finger matching biometric data $M_0$ from the finger biometric sensor 30 based upon a first finger placement adjacent the finger biometric sensor. The first finger matching biometric data is stored in the memory 26. The finger biometric data may include finger image data, ridge flow data, minutiae data, and/or other finger biometric data as will be appreciated by those skilled in the art. The processor 22, at Block 56, performs a first finger matching between the first finger matching biometric data and finger enrollment biometric data $E_0$, $E_1$, $E_2$ stored in the memory 26 to generate a first match score (FIG. 4a). If the first match score is above a match score threshold (Block 58), the processor 22 may perform a device function, for example, switch to a user-interface unlocked mode (Block 60).

The processor 22 acquires second finger matching biometric data $M_1$ from the finger biometric sensor 30 based upon a second finger placement adjacent the finger biometric sensor (Block 62). As will be appreciated by those skilled in the art, the second finger placement may include a removal and replacement of the user's finger adjacent the finger biometric sensor 30 relative to the first finger placement.

Figure 4B:
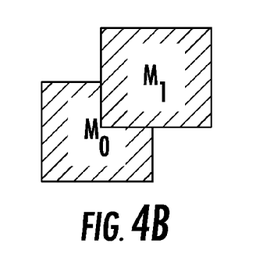
FIG. 4b is a diagram illustrating matching of first and second finger matching biometric data.

At Block 66, the processor 22 performs a matching between the first and second finger matching biometric data $M_0$, $M_1$ (FIG. 4b) to generate composite finger matching biometric data having an associated composite match score. This may be particularly advantageous, for example, if the first and second finger biometric matching data are sufficient for matching, i.e., their respective match scores exceed the match score threshold, but are not sufficient for enrollment, i.e., below an enrollment match score threshold, as will be explained in further detail below.

Figure 4C:
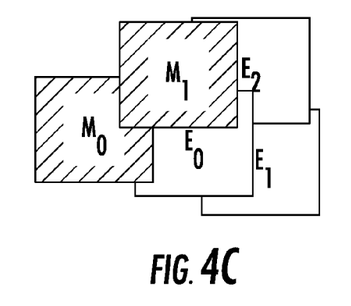
FIG. 4c is a diagram illustrating matching of composite finger matching biometric data to finger enrollment biometric data.
Figure 4D:
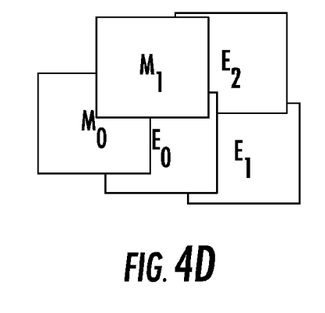
FIG. 4d is a diagram illustrating updating of the finger enrollment biometric data with the composite finger matching biometric data.

The processor 22, at Block 70, performs another matching between the composite finger matching biometric data and finger enrollment biometric data $E_0$, $E_1$, $E_2$ when the composite match score exceeds a composite match score threshold (Block 68) to generate an enrollment match score (FIG. 4c). When the enrollment match score exceeds an enrollment match score threshold (Block 72), the processor 22, at Block 84, updates the finger enrollment biometric data $E_0$, $E_1$, $E_2$ with the composite finger matching biometric data $M_0$, $M_1$ (FIG. 4d). It should be appreciated that the match score of the combined $M_0$, $M_1$ to any of $E_0$, $E_1$, $E_2$ is generally higher than each of the first and second match scores (i.e., $M_0$, $M_1$ individually) to any of $E_0$, $E_1$, $E_2$.

In some embodiments, the processor 22 may perform spoof detection on the first finger matching biometric data, the second finger matching biometric data, and/or the composite finger matching biometric data. The method ends at Block 86.

As will be appreciated by those skilled in the art, the updating of the finger enrollment biometric data with composite finger matching biometric data as described above may be considered a relatively continuous updating of the finger enrollment biometric data. By enrolling finger biometric data as described above, the electronic device 20 may be particularly advantageous for addressing changing finger conditions. For example, during an initial enrollment, a user's finger may be subject to different conditions than the user's finger several months later. Fingerprints, for example, change over time.

Additionally, the electronic device 20 updating the finger enrollment biometric data with composite finger matching biometric data may have a lower false acceptance rate, for example, 1 in $10^9$ as compared to 1 in $10^6$ in prior art matching techniques.

Figure 5:
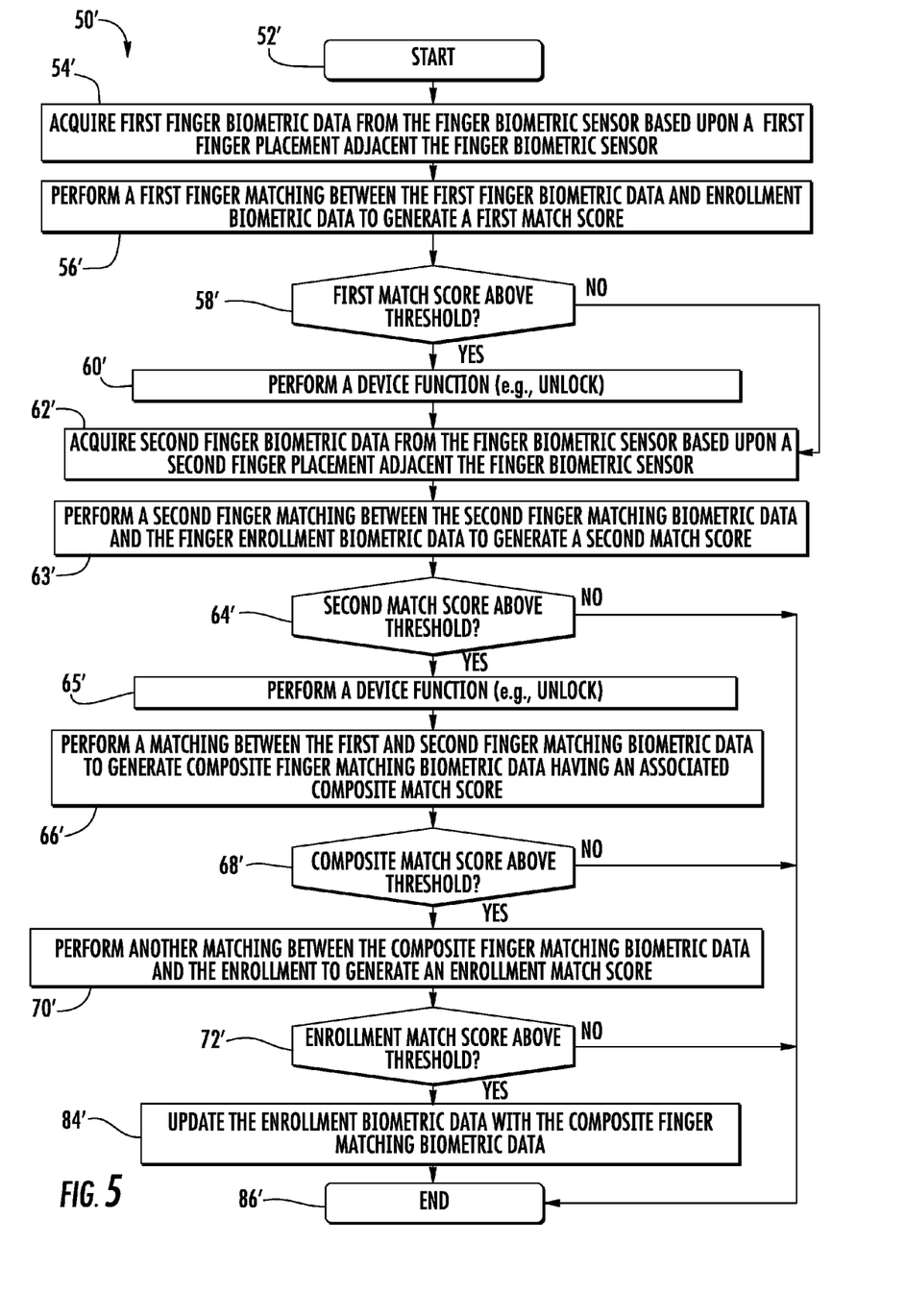
FIG. 5 is a flow diagram illustrating operation of the electronic device according to another embodiment.

Referring now to the flowchart 50' in FIG. 5, in another embodiment, prior to performing the matching between the first and second finger matching biometric data (Block 66'), the processor 22' may perform a second finger matching between the second finger matching biometric data and the finger enrollment biometric data to generate a second match score (Block 63'). If the second match score exceeds the match score threshold (Block 64'), the processor 22 may perform a device function (Block 65'), for example, switch to a user-interface unlocked mode. If the second match score is below the match score threshold, the method ends at Block 86'.

Figure 6:
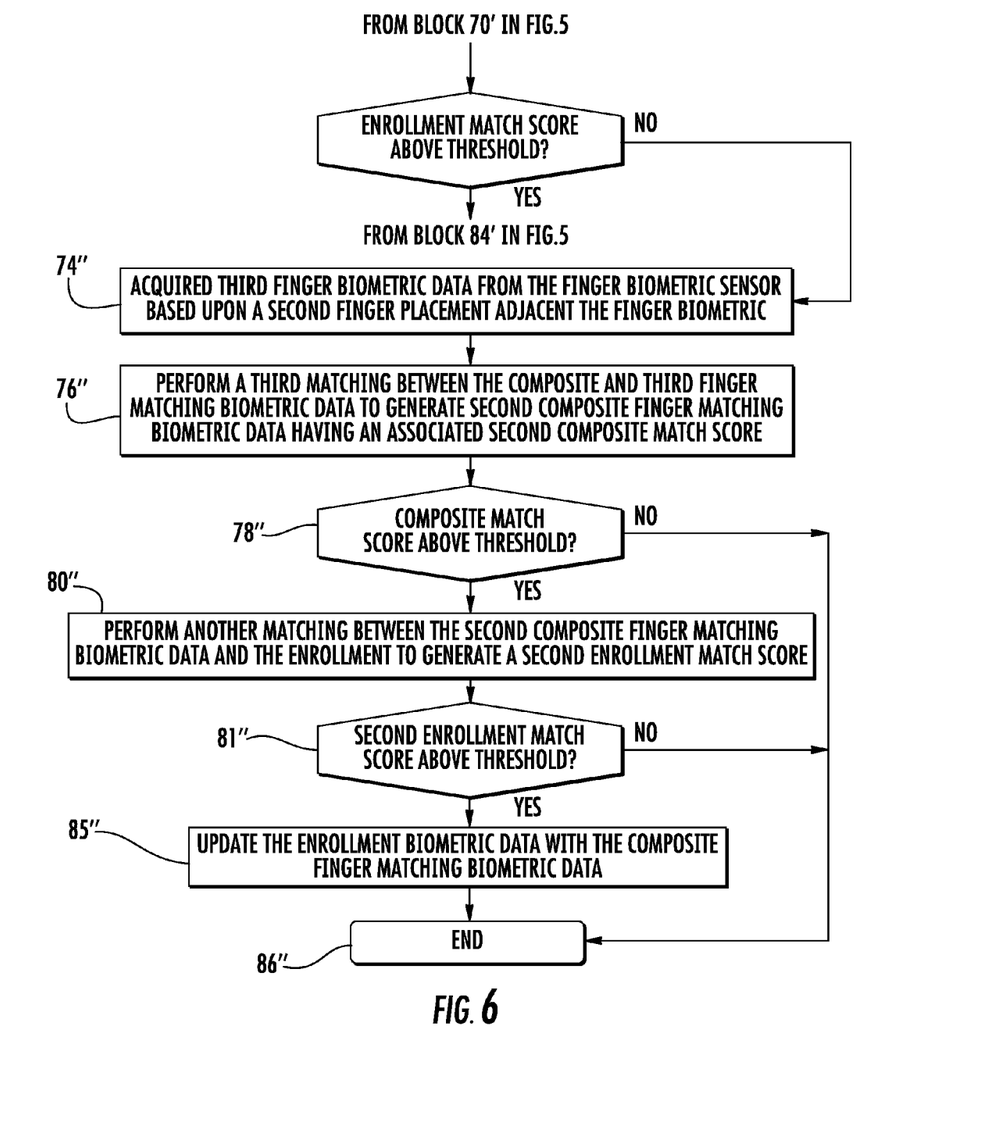
FIG. 6 is a flow diagram illustrating operation of the electronic device according to another embodiment.

Referring now to the flowchart in FIG. 6, in yet another embodiment, instead of ending the method when the enrollment match score does not exceed the enrollment match score threshold, the processor 22" acquires third finger biometric data from the finger biometric sensor 30" based upon a third finger placement adjacent the finger biometric sensor (Block 74") and performs a third matching between the composite finger matching biometric data and the third finger biometric data to generate second composite finger matching biometric data having an associated second composite match score (Block 76"). A third matching is performed between the second composite finger matching biometric data and the finger enrollment biometric data (Block 80") when the second composite match score exceeds the composite match score threshold (Block 78") to generate a second enrollment match score. If the second composite match score does not exceed the composite match score threshold (Block 78"), the method ends at Block 86". When the second enrollment match score exceeds the enrollment match score threshold (Block 78"), the processor 22" updates the finger enrollment biometric data with the second composite finger matching biometric data (Block 85"). The method ends at Block 86".

Figure 7:
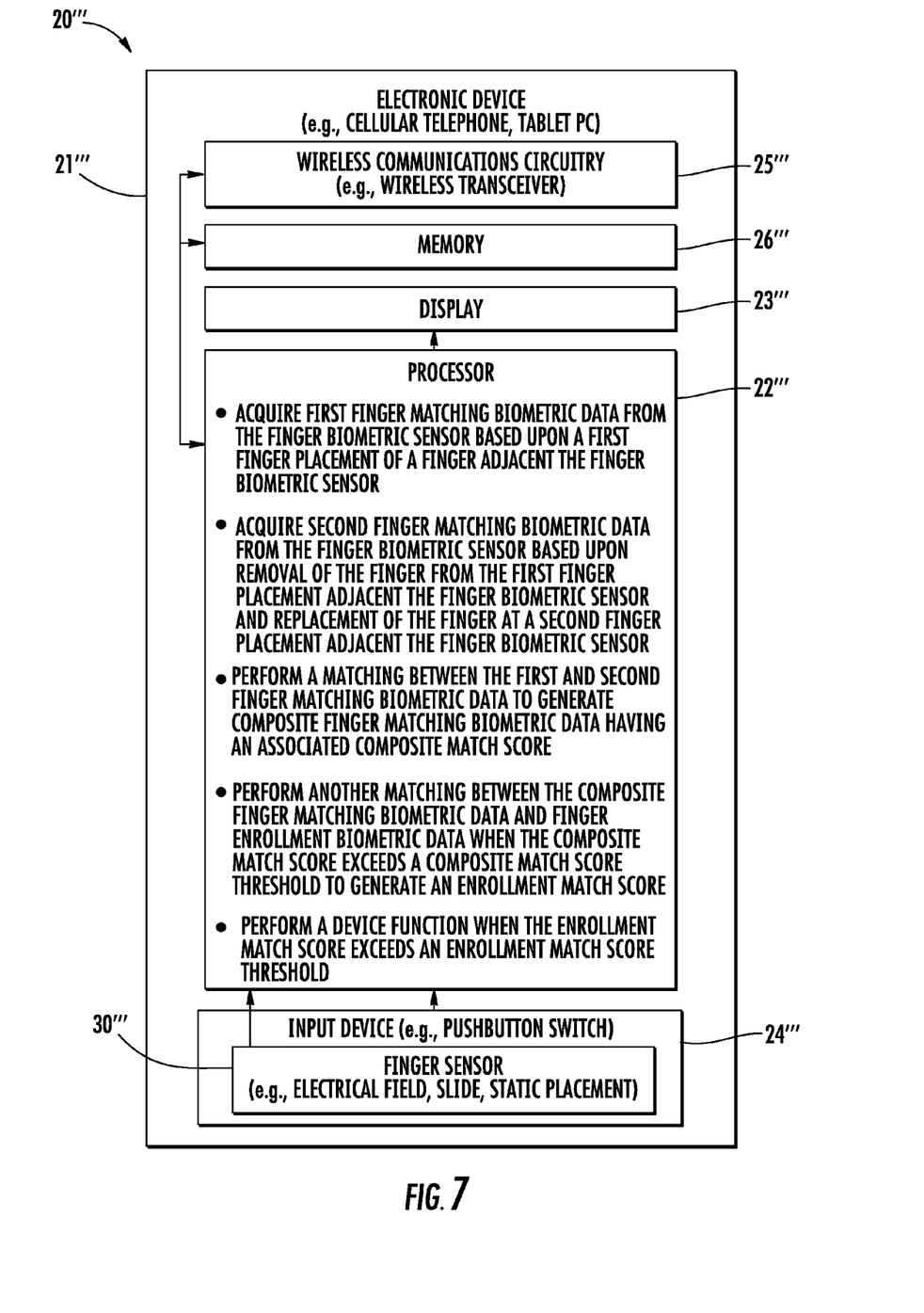
FIG. 7 is a schematic block diagram of an electronic device according to another embodiment.
Figure 8:
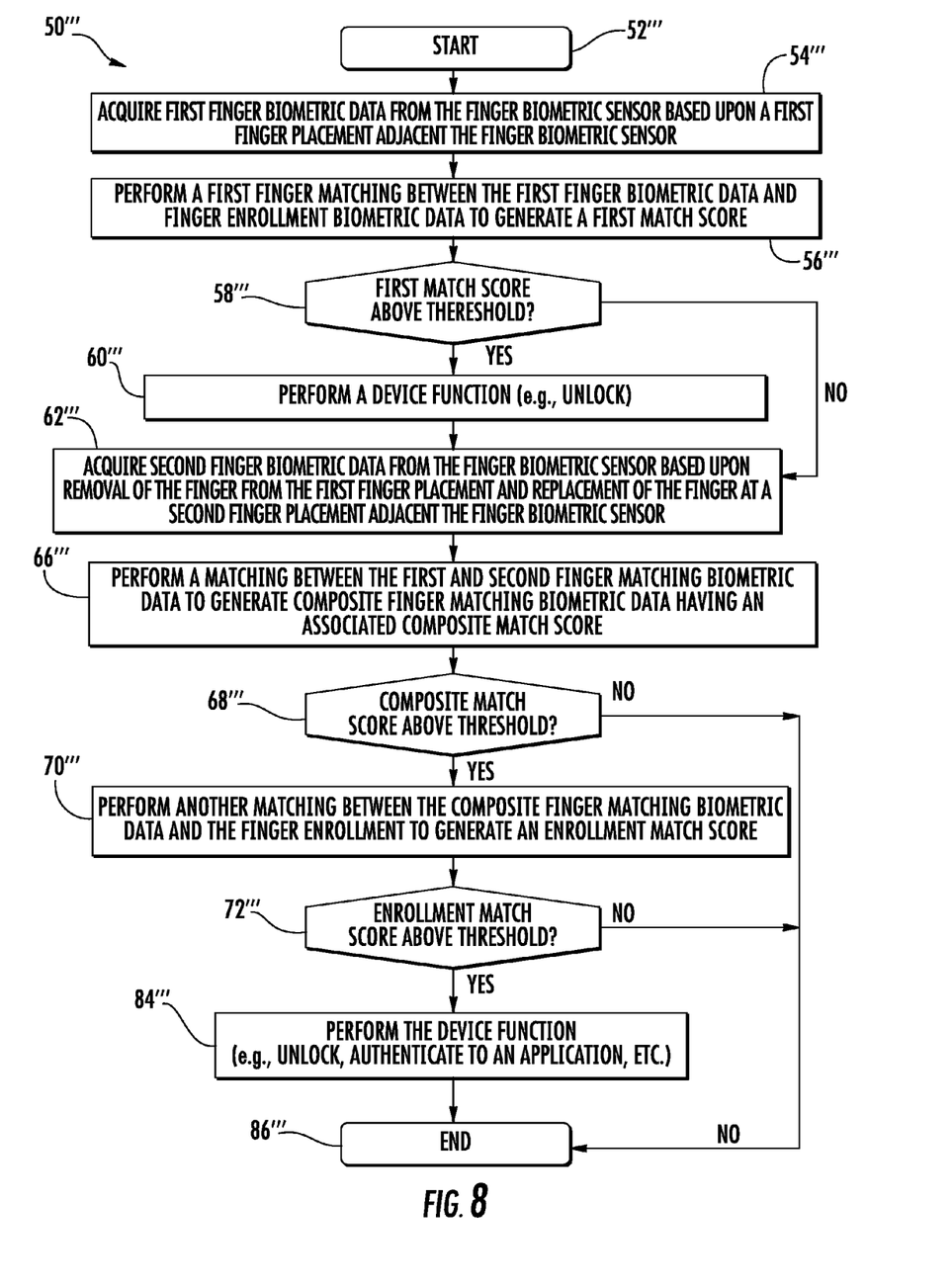
FIG. 8 is a flow diagram illustrating operation of the electronic device according to FIG. 7.

Referring now to FIGS. 7 and 8, another embodiment is directed to a method of performing a device function. In this embodiment, the processor 22''' may not update the enrollment biometric data. In particular, second finger matching biometric data is acquired from the finger biometric sensor 30''' based upon removal of the finger from the first finger placement adjacent the finger biometric sensor and replacement of the finger at a second finger placement adjacent the finger biometric sensor (Block 62'''). If the composite match score exceeds a composite score threshold at Block 68''' (which in some embodiments may generally be higher than the first match score alone), the processor 22''' may perform another matching between the composite finger matching biometric data and the finger enrollment data to generate an enrollment match score (Block 70'''). In other words, the combined or composite finger matching biometric data is used for matching against the finger enrollment data. If the enrollment match score exceeds an enrollment match score threshold (Block 72'''), the processor 22''' may perform a device function, at Block 84'''. Similar to the device function described above, the device function may include authenticating the user to an application, switch to a user-interface unlocked mode, or other device function. The method ends at Block 86'''.

Many modifications and other embodiments will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:
1. An electronic device comprising:
a finger biometric sensor;
a processor coupled to the finger biometric sensor and capable of
  acquiring first finger matching biometric data from the finger biometric sensor based upon a first finger placement adjacent the finger biometric sensor, acquiring second finger matching biometric data from the finger biometric sensor based upon a second finger placement adjacent the finger biometric sensor, performing a matching between the first and second finger matching biometric data to generate composite finger matching biometric data having an associated composite match score, performing another matching between the composite finger matching biometric data and finger enrollment biometric data when the composite match score exceeds a composite match score threshold to generate an enrollment match score, and updating the finger enrollment biometric data with the composite finger matching biometric data when the enrollment match score exceeds an enrollment match score threshold.

2. The electronic device of claim 1 wherein the processor is capable of performing a first finger matching between the first finger matching biometric data and the finger enrollment biometric data.

3. The electronic device of claim 1 wherein the processor is capable of performing a second finger matching between the second finger matching biometric data and the finger enrollment biometric data.

4. The electronic device of claim 1 further comprising a memory coupled to the processor and capable of storing the finger enrollment biometric data.

5. The electronic device of claim 4 wherein the memory is capable of storing the first finger matching biometric data.

6. The electronic device of claim 1 further comprising a housing and a user input device carried by the housing; and wherein the user input device carries the finger biometric sensor.

7. The electronic device of claim 6 wherein the user input device comprises a finger-operated input device; and wherein the processor is capable of performing the matching and the another matching also based upon operation of the finger-operated user input device.

8. The electronic device of claim 1 further comprising a wireless transceiver coupled to the processor.

9. The electronic device of claim 1 wherein the finger biometric sensor comprises a slide finger biometric sensor.

10. The electronic device of claim 1 wherein the finger biometric sensor comprises a static placement finger biometric sensor.

11. The electronic device of claim 1 wherein the processor is capable of, when the enrollment match score does not exceed the enrollment match score threshold:

acquiring third finger biometric data from the finger biometric sensor;

performing a third matching between the composite finger matching biometric data and the third finger biometric data to generate second composite finger matching biometric data having an associated second composite match score;

perform a third matching between the second composite finger matching biometric data and the finger enrollment biometric data when the second composite match score exceeds the composite match score threshold to generate a second enrollment match score; and updating the finger enrollment biometric data with the second composite finger matching biometric data when the second enrollment match score exceeds the enrollment match score threshold.

12. An electronic device comprising:

a finger biometric sensor;

a processor coupled to the finger biometric sensor and capable of acquiring first finger matching biometric data from the finger biometric sensor based upon a first finger placement of a finger adjacent the finger biometric sensor, acquiring second finger matching biometric data from the finger biometric sensor based upon removal of the finger from the first finger placement adjacent the finger biometric sensor and replacement of the finger at a second finger placement adjacent the finger biometric sensor, performing a matching between the first and second finger matching biometric data to generate composite finger matching biometric data having an associated composite match score, performing another matching between the composite finger matching biometric data and finger enrollment biometric data when the composite match score exceeds a composite match score threshold to generate an enrollment match score, and performing a device function when the enrollment match score exceeds an enrollment match score threshold.

13. The electronic device of claim 12 wherein the processor is capable of performing a first finger matching between the first finger matching biometric data and the finger enrollment biometric data.

14. The electronic device of claim 12 wherein the processor is capable of performing a second finger matching between the second finger matching biometric data and the finger enrollment biometric data.

15. A method of updating finger enrollment biometric data in an electronic device comprising a finger biometric sensor and a processor coupled to the finger biometric sensor, the method comprising:

using the processor for acquiring first finger matching biometric data from the finger biometric sensor based upon a first placement adjacent the finger biometric sensor, acquiring second finger matching biometric data from the finger biometric sensor based upon a second finger placement adjacent the finger biometric sensor, performing a matching between the first and second finger matching biometric data to generate composite finger matching biometric data having an associated composite match score, performing another matching between the composite finger matching biometric data and the finger enrollment biometric data when the composite match score exceeds a composite match score threshold to generate an enrollment match score, and updating the finger enrollment biometric data with the composite finger matching biometric data when the enrollment match score exceeds an enrollment match score threshold.

16. The method of claim 15 wherein the processor is used for performing a first finger matching between the first finger matching biometric data and the finger enrollment biometric data.

17. The method of claim 15 wherein the processor is used for performing a second finger matching between the second finger matching biometric data and the finger enrollment biometric data.

18. The method of claim 15 wherein the finger biometric sensor comprises a slide finger biometric sensor.

19. The method of claim 15 wherein the finger biometric sensor comprises a static placement finger biometric sensor.

20. The method of claim 15 wherein the processor is used, when the enrollment match score does not exceed the enrollment match score threshold, for
- acquiring third finger biometric data from the finger biometric sensor;
- performing a third matching between the composite finger matching biometric data and the third finger biometric data to generate second composite finger matching biometric data having an associated second composite match score;
- perform a third matching between the second composite finger matching biometric data and the finger enrollment biometric data when the second composite match score exceeds the composite match score threshold to generate a second enrollment match score; and
- updating the finger enrollment biometric data with the second composite finger matching biometric data when the second enrollment match score exceeds the enrollment match score threshold.

21. A method of performing a device function in an electronic device comprising a finger biometric sensor and a processor coupled to the finger biometric sensor, the method comprising:
- using the processor for
  - acquiring first finger matching biometric data from the finger biometric sensor based upon a first finger placement of a finger adjacent the finger biometric sensor,
  - acquiring second finger matching biometric data from the finger biometric sensor based upon removal of the finger from adjacent the finger biometric sensor and replacement of the finger at a second finger placement adjacent the finger biometric sensor,
  - performing a matching between the first and second finger matching biometric data to generate composite finger matching biometric data having an associated composite match score,
  - performing another matching between the composite finger matching biometric data and finger enrollment biometric data when the composite match score exceeds a composite match score threshold to generate an enrollment match score, and
  - performing the device function when the enrollment match score exceeds an enrollment match score threshold.

22. The method of claim 21 wherein the processor is used for performing a first finger matching between the first finger matching biometric data and the finger enrollment biometric data.

23. The method of claim 21 wherein the processor is used for performing a second finger matching between the second finger matching biometric data and the finger enrollment biometric data.

* * * * *